(12) United States Patent
Muthusami et al.

(10) Patent No.: US 11,550,691 B2
(45) Date of Patent: Jan. 10, 2023

(54) COMPUTING RESOURCES SCHEDULE RECOMMENDATION

(71) Applicant: ServiceNow, Inc., Santa Clara, CA (US)

(72) Inventors: Ayyappa Muthusami, Fremont, CA (US); Jiani Chen, San Jose, CA (US); Amanjit Singh Johal, Foster City, CA (US); Susanta K. Nanda, San Jose, CA (US); Devarajan Sundararajan, San Ramon, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/342,152

(22) Filed: Jun. 8, 2021

(65) Prior Publication Data

US 2022/0393992 A1    Dec. 8, 2022

(51) Int. Cl.
| | | |
|---|---|---|
| *G06F 11/34* | (2006.01) | |
| *H04L 47/78* | (2022.01) | |
| *H04L 47/762* | (2022.01) | |
| *G06N 3/04* | (2006.01) | |
| *G06K 9/62* | (2022.01) | |
| *H04L 47/70* | (2022.01) | |
| *G06F 9/50* | (2006.01) | |
| *G06F 9/54* | (2006.01) | |

(52) U.S. Cl.
CPC ........ *G06F 11/3447* (2013.01); *G06F 9/5011* (2013.01); *G06F 9/5072* (2013.01); *G06F 9/542* (2013.01); *G06K 9/6256* (2013.01); *G06N 3/04* (2013.01); *H04L 47/762* (2013.01); *H04L 47/781* (2013.01); *H04L 47/822* (2013.01)

(58) Field of Classification Search
CPC ............ G06F 11/3447; G06F 11/3495; G06F 11/3006; G06F 9/5072; G06F 9/542; G06F 9/5011; G06F 9/5077; G06N 20/00
See application file for complete search history.

(56) References Cited

U.S. PATENT DOCUMENTS

2020/0065216 A1* 2/2020 Savalgi ............... G06F 11/3447
2021/0064431 A1* 3/2021 Smith ..................... G06F 9/542

* cited by examiner

*Primary Examiner* — Kyung H Shin
(74) *Attorney, Agent, or Firm* — Van Pelt, Yi & James LLP

(57) ABSTRACT

Properties associated with computing resources are received. At least a portion of the received properties is used to cluster the computing resources into one or more operating groups. At least a portion of the received properties is used to determine a recommendation of an operation schedule for at least one of the one or more operating groups. The recommendation is provided. A feedback is received in response to the recommendation.

20 Claims, 6 Drawing Sheets

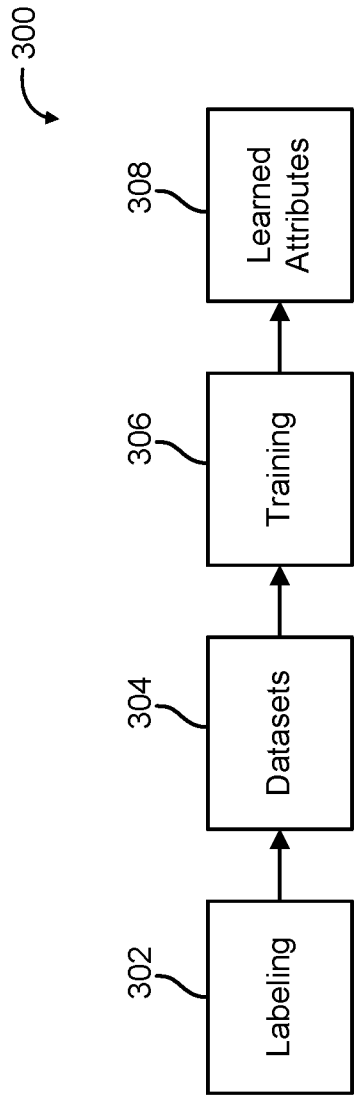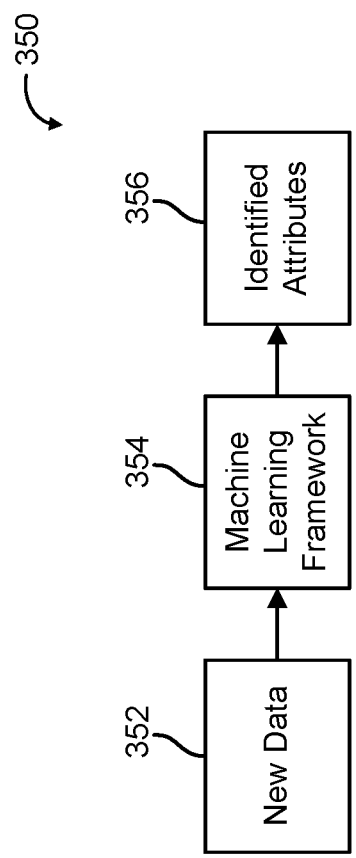

COMPUTING RESOURCES SCHEDULE RECOMMENDATION

BACKGROUND OF THE INVENTION

A computing resource (also referred to as a system resource, resource, etc.) is any physical or virtual component of limited availability within a computer system. For example, connected devices and internal system components of a computer system are computing resources. Virtual system resources include files, network connections, and memory areas. Computing resources can be used in cloud computing to provide services through networks. Managing resources is referred to as resource management and includes reducing costs associated with utilizing resources. Costs may be reduced by appropriate scheduling of computing resources. Thus, it would be beneficial to develop improved techniques for scheduling computing resources.

BRIEF DESCRIPTION OF THE DRAWINGS

Various embodiments of the invention are disclosed in the following detailed description and the accompanying drawings.

FIG. 3A is a high-level block diagram of an embodiment of a machine learning based framework for learning attributes associated with datasets.

FIG. 3B is a high-level block diagram of an embodiment of a machine learning based framework for identifying data attributes.

DETAILED DESCRIPTION

Figure 1:
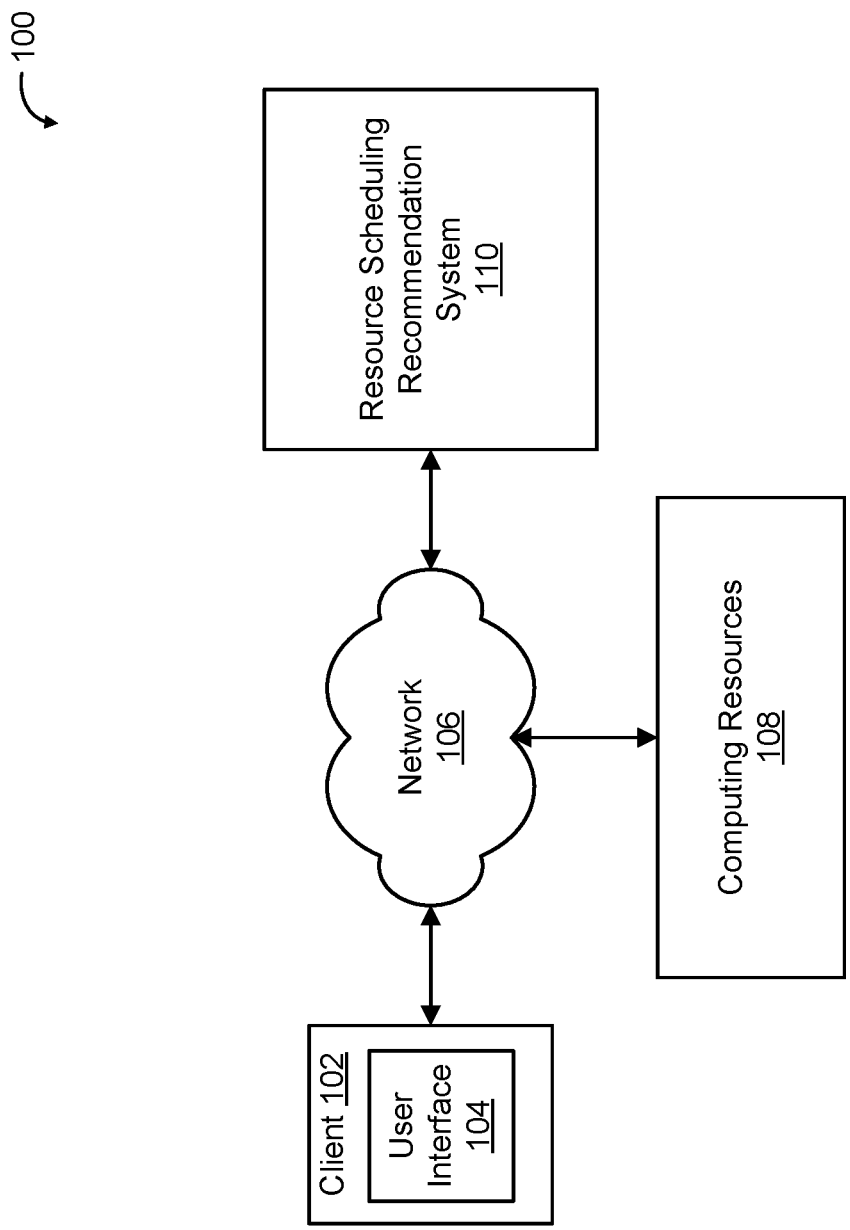
FIG. 1 is a block diagram illustrating an embodiment of a system for managing computing resources.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Computing resources schedule recommendation is disclosed. Properties associated with computing resources are received. At least a portion of the received properties is used to cluster the computing resources into one or more operating groups. At least a portion of the received properties is used to determine a recommendation of an operation schedule for at least one of the one or more operating groups. The recommendation is provided. A feedback is received in response to the recommendation. A practical and technological benefit of the techniques disclosed herein is more efficient utilization of computing resources. The techniques disclosed herein are superior to prior approaches that involve matching computing resources to predefined schedules, which are planning-intensive and less flexible.

In various embodiments, computing resources scheduling recommendations are made based on usage and tags. For example, similar pattern computing resources (e.g., physical machines, virtual machines, or other computing resources) may be found based on their usage and tags and can be clustered. Clustering of computing resources based on usage to refine up and down times of computing resources saves costs. Clustering based on tags can group computing resources owned by similar groups or business units or operated in similar time zones. In some embodiments, a time window of operation (e.g., hours or operation) for computing resources is suggested based at least in part on past usage data.

In various embodiments, metrics are collected to determine computing resource usage. Examples of metrics include central processing unit (CPU) utilization, computer memory (also referred to simply as memory) utilization, network data transfer utilization, and so forth. An example of memory is random-access memory (RAM). CPU, memory, and network data transfer utilization are indicative of a computing resource's idle time. Idle times can be learned based on usage patterns. Examples of computing resources include physical machines, virtual machines, network computing resources, computer memory resources, data storage resources, and so forth. In various embodiments, any computing resource that can be programmatically controlled to be started and stopped and for which metrics can be collected can be scheduled using the techniques disclosed herein.

In various embodiments, usage patterns of computing resources are learned based on metrics data, the computing resources are clustered based on the learned usage patterns, and scheduling recommendations are generated. Metrics data may be collected from a cloud provider for all active computing resources. Key metrics, such as those associated with CPU, memory, and network data transfer, may be selected to determine idle times of computing resources. In various embodiments, the hours of idle time for computing resources for one day of the week, several days of the week, or all days of the week are forecasted based on idle times learned based on usage patterns. In various embodiments, computing resources are clustered based on hours of usage and business hours (hours of operation) are determined for each cluster. In some embodiments, machine learning models are utilized to output computing resource clusters and hours of operation for the clusters. In various embodiments, hours of operation (also referred to as on times/hours, up times/hours, active times/hours, etc.) for determined clusters are recommended to a user. The user may override and/or modify recommendations. In some embodiments, this feedback from the user is learned and incorporated into one or more machine learning models. In various embodiments, clustering of computing resources is periodically updated (e.g., to account for new computing resources, to incorporate user feedback, etc.).

FIG. 1 is a block diagram illustrating an embodiment of a system for managing computing resources. In the example shown, system 100 includes client 102, network 106, computing resources 108, and resource scheduling recommendation system 110. In various embodiments, client 102 is a computer or other hardware device that a user utilizes to perform computing resource management tasks. Examples of client hardware devices include desktop computers, laptop computers, tablets, smartphones, and other devices. In the example illustrated, client 102 includes user interface 104. In various embodiments, user interface 104 is a software user interface through which the user interacts with resource scheduling recommendation system 110. The software user interface may be a web portal, internal network portal, or other portal that allows users to transmit and receive data. Other examples of software include browsers, mobile apps, etc. User interface 104 may be used to review, accept, reject, and/or modify recommendations received from resource scheduling recommendation system 110.

In the example illustrated, client 102 is communicatively connected to network 106. Requests may be transmitted to and responses received from resource scheduling recommendation system 110 using network 106. Examples of network 106 include one or more of the following: a direct or indirect physical communication connection, mobile communication network, Internet, intranet, Local Area Network, Wide Area Network, Storage Area Network, and any other form of connecting two or more systems, components, or storage devices together. In the example illustrated, client 102 and resource scheduling recommendation system 110 are also communicatively connected to computing resources 108 via network 106. In various embodiments, computing resources 108 is a collection of computer or other hardware components along with associated software applications loaded onto the computer or other hardware components. Computing resources 108 can also include communications/networks and storage hardware and software components. In various embodiments, computing resources 108 includes a collection of computing machines (e.g., physical machines and/or virtual machines) distributed across a plurality of servers. As used herein, a virtual machine refers to the creation of a computing resource that acts like a real computer with an operating system. Software executed on virtual machines are separated from underlying hardware resources. Thus, a single physical host machine may support multiple virtual machines (e.g., a first virtual machine running a first operating system, a second virtual machine running a second operating system, and so forth). Other computing resources may also be virtualized. For example, container virtualization to create virtualization containers refers to operating system level virtualization in which multiple isolated user spaces exist. Operating system level virtualization is distinguishable from hardware level virtualization with virtual machines in that each virtual machine needs its own operating system, but each virtualization container can run without an independent operating system.

In various embodiments, resource scheduling recommendation system 110 includes a recommendation framework configured to analyze metrics associated with computing resources 108 and determine patterns within computing resources 108. In various embodiments, resource scheduling recommendation system 110 includes a machine learning framework that utilizes labeled datasets to train one or more models to learn these patterns as well as a machine learning framework to identify these patterns in non-labeled datasets. In various embodiments, resource scheduling recommendation system 110 includes tools configured to cluster computing resources into multiple operating groups based on received metrics (e.g., CPU, memory, network data transfer utilization) and forecast start and stop schedules for each of the multiple operating groups based on the received metrics. In various embodiments, resource scheduling recommendation system 110 provides recommendations for start and stop schedules for the multiple operating groups to client 102.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients may exist. The number of components and the connections shown in FIG. 1 are merely illustrative. Components not shown in FIG. 1 may also exist.

Figure 2:
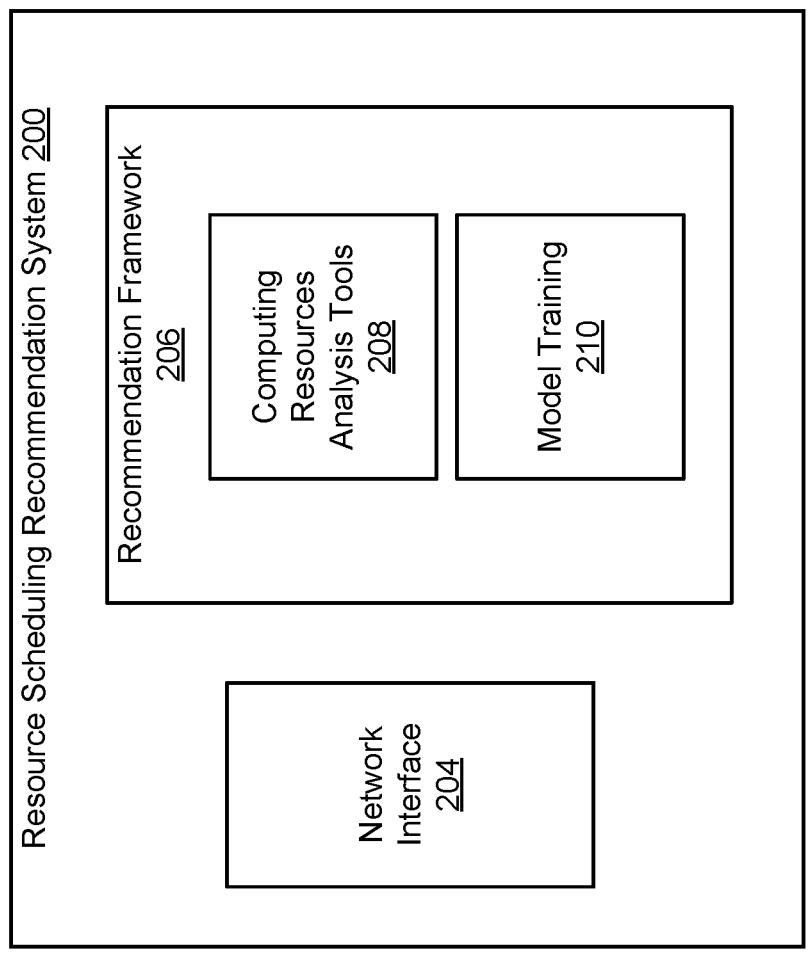
FIG. 2 is a block diagram illustrating an embodiment of a system for resource scheduling recommendation.

FIG. 2 is a block diagram illustrating an embodiment of a system for resource scheduling recommendation. In some embodiments, resource scheduling recommendation system 200 is resource scheduling recommendation system 110 of FIG. 1.

In the example shown, resource scheduling recommendation system 200 includes network interface 204 and recommendation framework 206. Network interface 204 is configured to receive commands from a user (e.g., client 102 of FIG. 1) as well as data metrics associated with computing resources to schedule (e.g., computing resources 108 of FIG. 1). In addition, network interface 204 is configured to send scheduling recommendations for feedback (e.g., to client 102 of FIG. 1). Network interface 204 allows a processor of resource scheduling recommendation system 200 to receive information (e.g., data objects or program instructions) from another computer or network and output information to another computer or network in the course of performing method/process steps. In various embodiments, network interface 204 includes an interface card (e.g., an Ethernet card) or similar device and appropriate software implemented by (e.g., executed/performed on) a processor to connect resource scheduling recommendation system 200 to an external network and transfer data according to standard protocols, e.g., across a network such as the Internet, intranet networks, or local area networks.

In the example illustrated, recommendation framework 206 includes computing resources analysis tools 208 and model training 210. In various embodiments, computing resources analysis tools 208 includes computer program instructions that are executable on a processor and cause collected metrics data associated with computing resources to be analyzed. In various embodiments, model training 210 includes computer program instructions that are executable on a processor and used for machine learning model training.

In various embodiments, computing resources analysis tools 208 includes computer program instructions for performing forecasting and clustering analysis. In various embodiments, properties associated with computing resources are received in order to forecast active or idle times associated with the computing resources. Examples of properties include CPU utilization, memory utilization, and network data transfer rates. Examples of computing resources include virtual machines, physical computers, and parts thereof of virtual machines or physical computers. For example, in some embodiments, the computing resources are virtual machines that are performing computing tasks and historical CPU utilization is one of the properties utilized to forecast future hours of activity versus idleness for each of the virtual machines. Predicting future hours of relative inactivity is useful because computing resources that are likely to be inactive or underutilized during specified times can be turned off, powered down, released, etc. in order to conserve resources. The example of using CPU utilization for virtual machines is illustrative and not restrictive. For example, CPU utilization, memory utilization, and network data transfer can be considered together in a combined metric that is a weighted average of the individual metrics. In addition, the same analysis is equally applicable to physical computers, or other computing resources, as to virtual machines. In the example given above with respect to CPU utilization and virtual machines, each virtual machine's CPU utilization can be analyzed according to time of day. For example, CPU utilization for each virtual machine during each hour, half an hour, quarter of an hour, or other window of time can be analyzed over a specified number of days (e.g., 3 days, 5 days, 7 days, etc.) to determine in which blocks of time CPU utilization for that virtual machine is high versus low. High CPU utilization is indicative of a virtual machine active status and low CPU utilization is indicative of a virtual machine idle status.

Thus, in various embodiments, historical time series data of a performance metric (e.g., CPU utilization) is collected for analysis for a computing resource (e.g., a virtual machine). In various embodiments, the historical time series data is utilized in forecasting analysis to predict future performance (e.g., future trends in CPU utilization). As used herein, machine learning includes forecasting. Forecasting is an example of utilizing numerical methods to analyze and draw inferences from patterns in data. Forecasting predicts or estimates a future event or trend. Examples of forecasting analysis techniques that may be utilized include autoregression, moving average, vector autoregression, least squares estimation, nonlinear regression, time series decomposition, and other techniques. In some embodiments, a deep learning forecasting approach utilizing neural networks, such as a long short-term memory (LSTM) neural network, is used. Such an approach utilizes a machine learning framework in which collected time series data (e.g., collected historical CPU utilization) is used to train a machine learning model (e.g., an LSTM neural network) to predict future instances of the time series data. LSTM neural networks are an example architecture. Other neural network architectures, e.g., multi-layer perceptron (MLP), convolutional neural network (CNN), and hybrid architectures are also possible.

In various embodiments, outputs of forecasting analysis comprise forecasted levels of activity (e.g., CPU utilization) for specified periods of the day (e.g., specified hours or portions thereof) for each computing resource (e.g., virtual machine) to be scheduled. In various embodiments, the computing resources (e.g., all the virtual machines to be scheduled) are clustered based on one or more data metrics (e.g., CPU utilization) associated with computing resource activity. As used herein, clustering refers to grouping a set of objects in such a manner that objects in the same group, called a cluster, are more similar, in one or more respects, to each other than to objects in other groups. Clustering can be a component of classification analysis, which involves identifying to which of a set of categories a new observation belongs. As used herein, machine learning includes clustering. Clustering is an example of utilizing numerical methods to analyze and draw inferences from patterns in data.

In various embodiments, individual computing resources (e.g., individual virtual machines) are identified according to labels (e.g., tags) that allow association of utilization metrics to each individual computing resource. In various embodiments, computing resources (e.g., virtual machines) are clustered based on determined numerical representations. In some embodiments, the numerical representations are vector representations of utilization metrics (e.g., CPU utilization, memory utilization, and network data transfer rate as a function of hour of the day or other specified period of the day). In various embodiments, distances between vectors corresponding to the different computing resources are calculated according to a specified distance metric. In some embodiments, the distance metric is Euclidean distance. Other distance metrics are also possible. Examples of other distance metrics include Manhattan distance, Minkowski distance, and Hamming distance. Data entries (e.g., individual virtual machines or other computing resources) are clustered based on the distance metric (e.g., data entries within a threshold range of each other are determined to be in the same cluster). In some embodiments, k-means clustering is applied to the determined numerical representations (e.g., vectors) to cluster the data entries. Other clustering approaches are also possible. Examples of other clustering approaches include mean-shift clustering, expectation-minimization clustering using gaussian mixture models, agglomerative hierarchical clustering, and density-based spatial clustering of applications with noise (DB SCAN).

In some embodiments, a deep learning clustering approach utilizing neural networks, such as an MLP neural network, is used. Such an approach utilizes a machine learning framework in which collected computing resource data (e.g., utilization as a function of time of day for virtual machines) is first manually analyzed, labeled, and used in supervised training of a machine learning model to learn attributes associated with manually-verified clustered groups of computing resources. The trained machine learning model can subsequently be utilized in an unsupervised mode (inference mode) to cluster new data (e.g., other groups of computing resources). As used herein, deep learning refers to an automated prediction mechanism or procedure (e.g., in computer code form) that results from training the automated prediction mechanism on manually provided training data. Training the automated prediction mechanism comprises iteratively tuning and adjusting the prediction mechanism (e.g., rules, algorithms, etc.) so that outputs of the prediction mechanism (the prediction outputs) fit the known, correct outputs associated with the training data. Mappings between training data inputs and outputs are known a priori, e.g., because they are determined through human review. Through deep learning, a machine learning model represents what is learned by a machine learning algorithm (a procedure applied to input data to arrive at an output prediction) after the machine learning algorithm is tuned according to training data. A trained machine learning model can be utilized to generate outputs associated with input data whose true, correct outputs are not known a priori, which is referred to as utilizing the machine learning model in inference mode (as opposed to training mode when the machine learning model is tuned based on training data).

In various embodiments, model training 210 includes computer program instructions for performing training of machine learning models (e.g., neural networks) to perform forecasting and/or clustering analysis. Thus, computing resources analysis tools 208 can include frameworks to utilize machine learning models in inference mode, wherein the machine learning models are trained in model training 210. In some embodiments, as an alternative to the approach outlined above, forecasting is performed after clustering. Stated alternatively, computing resources can be clustered based on historical utilization metrics (e.g., CPU utilization) and then forecasts of future utilization can be made. In various embodiments, after forecasting and clustering or clustering and forecasting, recommendation framework 206 provides recommendations for operating times (also referred to as business hours) for analyzed computing resources. In various embodiments, a recommended schedule is provided for each determined cluster of computing resources. For example, when the computing resources are virtual machines, clustering analysis would determine various groups of virtual machines and forecasting analysis would determine when the virtual machines are likely to be active. For each group of virtual machines (or other computing resources), a recommendation is made as to time periods (e.g., specific hours) that the virtual machines (or other computing resources) should be active (e.g., started, left on, powered on, etc.) because they are forecasted to be well-utilized according to historical utilization metrics. In some embodiments, the forecasted periods of activity (e.g., forecasted hours of high utilization) of computing resources are the recommended periods for activating/keeping on (e.g., business hours) for the computing resources. In various embodiments, recommendations are transmitted by network interface 204 to a user for feedback (e.g., approval, rejection, modification, etc.). Feedback from the user may be utilized for further model training in model training 210.

FIG. 3A is a high-level block diagram of an embodiment of a machine learning based framework for learning attributes associated with datasets. In some embodiments, framework 300 is utilized to train a machine learning model to forecast periods of time (e.g., hours of the day) that computing resources are active and/or to cluster computing resources. In many cases, datasets 304 comprise collections of computing resources and associated properties data (e.g., CPU utilization, memory utilization, and network data transfer rates as a function of time of day). These datasets may be populated and categorized into related groups by manual labeling 302. For example, groups of computing resources that are active during similar time periods of the day may be manually grouped and labeled. In some embodiments, training for clustering includes training on datasets comprising a constrained set of computing resources associated with prescribed operating groups to which the computing resources belong. In some embodiments, training for forecasting includes training on datasets comprising a constrained set of computing resources associated with prescribed operating times associated with the computing resources.

Datasets 304 are tagged with comprehensive sets of labels or metadata. A set of labels defined and/or selected for computing resources of a prescribed dataset may include one or more hierarchical high-level labels that provide classification of the computing resource and may furthermore include lower-level labels comprising ground truth data associated with periods of computing resource activity. Datasets 304 are utilized for artificial intelligence learning. Training 306 performed on datasets 304, for example, using any combination of one or more appropriate machine learning techniques such as deep neural networks and convolutional neural networks, results in a set of one or more learned attributes 308. Such attributes may be derived or inferred from labels of datasets 304. For example, a learned attribute may be that a CPU utilization of 90% of available CPU resources indicates a high level of activity. In various embodiments, different training models may be used to learn different attributes. Furthermore, framework 300 may be utilized with respect to a plurality of different training datasets. After training on large sets of data to learn various attributes, framework 350 of FIG. 3B may subsequently be employed to detect similar attributes or combinations thereof in other datasets for which such attributes are unknown.

FIG. 3B is a high-level block diagram of an embodiment of a machine learning based framework for identifying data attributes. In some embodiments, framework 350 is utilized to forecast periods of time (e.g., hours of the day) that computing resources are active and/or to cluster computing resources. Framework 350 operates on new data 352. New data 352 may comprise a plurality of computing resources (e.g., virtual machines, physical computers, other computing components, etc.). New data 352 is not labeled or tagged, e.g., with ground truth data. Individual components of new data 352 (e.g., individual virtual machines) share one or more common properties or attributes such as CPU utilization according to which the individual components can be categorized and grouped. New data 352 is processed by machine learning framework 354 to determine identified attributes 356.

In many cases, machine learning framework 354 is trained on large labeled datasets comprising a substantial subset of, if not all, possible permutations of objects of a constrained set of possible objects that may appear in a prescribed computing resource activity profile in order to learn associated attributes and combinations thereof and which may subsequently be employed to detect or identify such attributes in other collections of computing resources. For example, identified attributes 356 may include an activity status such as "active during the hours 5 AM to 12 PM". In some embodiments, identified attributes 356 includes identified hours, half hours, or quarter hours of computing resource active status. In some embodiments, identified attributes 356 includes groups of computing resources that have similar hourly active statuses.

Figure 4:
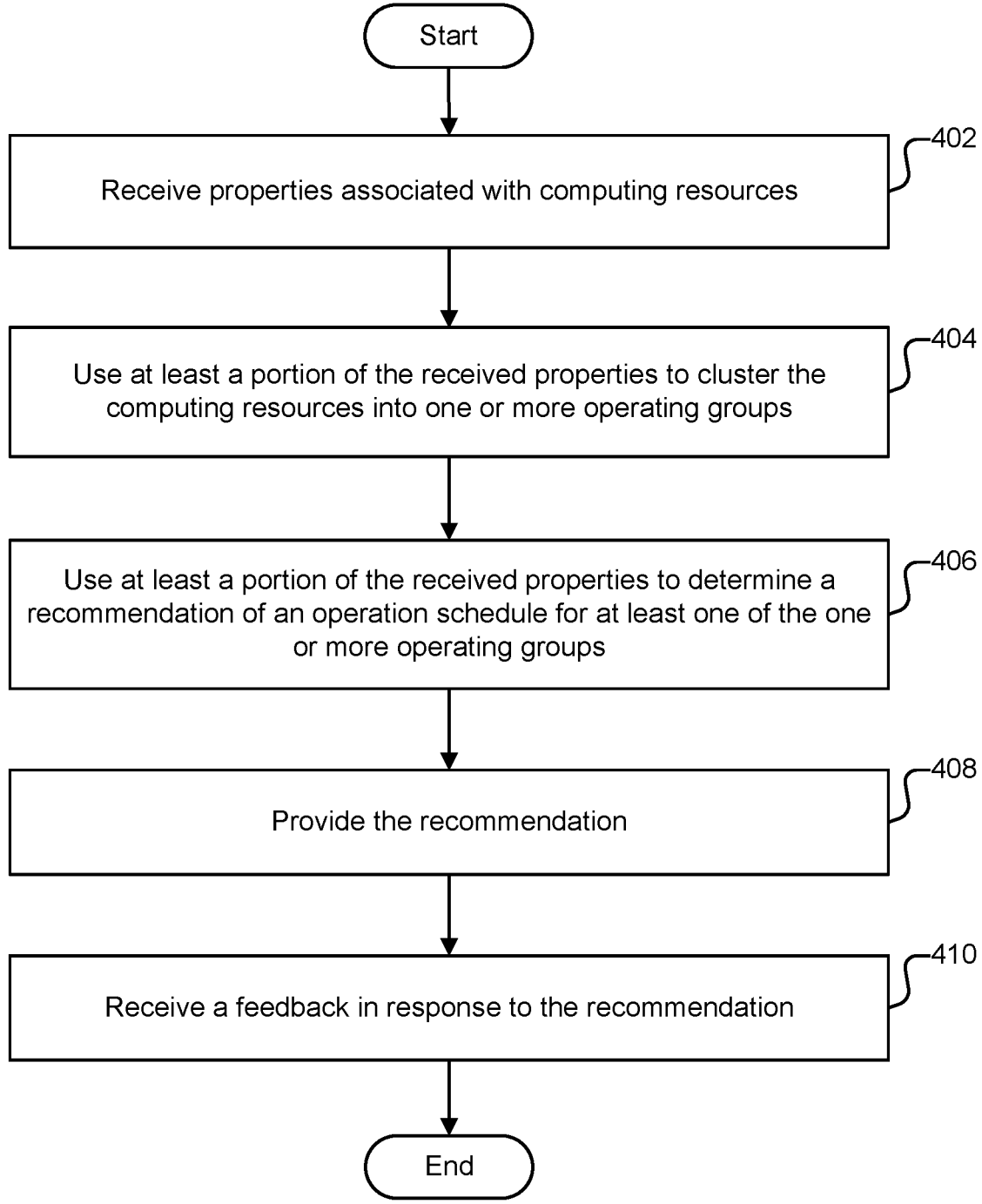
FIG. 4 is a flow diagram illustrating an embodiment of a process for recommending computing resource scheduling.

FIG. 4 is a flow diagram illustrating an embodiment of a process for recommending computing resource scheduling. In some embodiments, the process of FIG. 4 is performed by resource scheduling recommendation system 110 of FIG. 1 and/or resource scheduling recommendation system 200 of FIG. 2.

At 402, properties associated with computing resources are received. Examples of computing resources include computers, servers, virtual machines, computer subcomponents, computer network components, and so forth. Another example of a computing resource is a computing service, such as a website with which Internet users can interact. Examples of properties include CPU utilization, memory utilization, storage utilization, data transfer rate, and so forth. In various embodiments, the computing resources are accessible over a network. Network monitoring software may collect properties associated with the computing resources over time (e.g., continuously or periodically). In various embodiments, each computing resource is individually identifiable (e.g., an individually identifiable virtual machine) and properties are tracked for each individual computing resource frequently enough and over a sufficiently lengthy period of time to generate a profile of level of activity of the computing resource during the 24 hours in a day. For example, CPU utilization can be measured every 5 minutes over the course of a week, month, etc. to determine specific hours of the day during which CPU utilization is higher relative to other hours of the day.

At 404, at least a portion of the received properties are used to cluster the computing resources into one or more operating groups. For example, computing resources may be clustered according to when CPU utilization for the computing resources is highest or exceeds a specified threshold. As an example, computing resources (e.g., virtual machines) may be clustered into two operating groups, a first group whose CPU utilization is high during daytime hours (e.g., from 6 AM to 6 PM of a specified time zone) but low during other times and a second group whose CPU utilization is high during nighttime hours (e.g., from 6 PM to 6 AM of the same specified time zone) but low during other times. This may be a result of the computing resources in the first operating group primarily serving users located in the specified time zone and the computing resources in the second operating group primarily serving user located in a time zone on the opposite side of Earth. Many more clusters of operating groups would likely be determined in a scenario in which computing resources are serving many different time zones. In general, clustering is affected by a plurality of properties that interact in complex ways. The effects of many properties affecting clustering can be captured by a numerical vector representation of properties. For example, the numerical vector representation can include a CPU utilization for each hour of the day for each computing resource, a memory utilization for each hour of the day for each computing resource, a network data transfer rate for each hour of the day for each computing resource, and so forth. Each utilization metric (e.g., CPU utilization) may be a forecasted metric (e.g., forecasted CPU utilization for a specified hour of the day) based on historical data.

At 406, at least a portion of the received properties are used to determine a recommendation of an operation (e.g., start and stop) schedule for at least one of the one or more operating groups. The operating groups may have been clustered according to numerical vector representations comprising numerous performance metrics. For example, CPU utilization and memory utilization may have been included in the clustering analysis. In some embodiments, one of the properties is utilized to determine periods of the day of high and low activity on which to base a start and stop schedule. For example, in some embodiments, for each cluster, times of day for which CPU utilization exceeds a specified threshold (e.g., 50%, 75%, 90% of available assigned CPU capacity) are designated as high activity/active periods and times of day for which CPU utilization does not exceed the specified threshold are designated as low activity/idle periods. In various embodiments, the recommendation of the start and stop schedule indicates periods of the day (e.g., hours) that each cluster of computing resources is on versus off, activated versus deactivated, etc. It is also possible to based start and stop schedules on multiple metrics (e.g., an average of when CPU utilization and memory utilization exceed corresponding specified thresholds). An advantage of activating and deactivating clusters of computing resources is efficiency of management. Instead of managing numerous computing resources, dimensionality of management is reduced to a smaller number of operating groups. Start and stop schedules are useful because resources (e.g., money, electrical power, etc.) are conserved by stopping computing resources when they are unlikely to be active (e.g., virtual machines that are unlikely to perform computing tasks because it is the middle of the night for users that typically assign tasks to those virtual machines).

In some embodiments, 404 and 406 are combined in a single step in which a machine learning model outputs operating groups as well as recommended start and stop schedules for the operating groups. For example, a machine learning model can be trained according to framework 300 of FIG. 3A using datasets comprising computing resources labeled with CPU utilization, memory utilization, and other performance metrics as well as manually determined operating groups and manually determined start and stop schedules for the operating groups. A trained machine learning model can then be utilized in framework 350 of FIG. 3B to determine operating groups and their recommended start and stop schedules for computing resources whose CPU utilization, memory utilization, and other performance metrics are known but that have not already been clustered into operating groups or assigned start and stop schedules.

At 408, the recommendation is provided. In various embodiments, the recommendation is provided through a user interface that allows for manual review of the recommendation. In some embodiments, the recommendation is provided to client 102 of FIG. 1 through user interface 104 of FIG. 1.

At 410, a feedback is received in response to the recommendation. Examples of feedback include approving the recommendation, rejecting the recommendation, or modifying the recommendation. In some embodiments, an approved or modified recommendation is implemented by transmitting the recommendation to a processor controlling activation of computing resources subject to the recommendation. In some embodiments, a modified recommendation is utilized as feedback to influence future recommendations.

Figure 5:
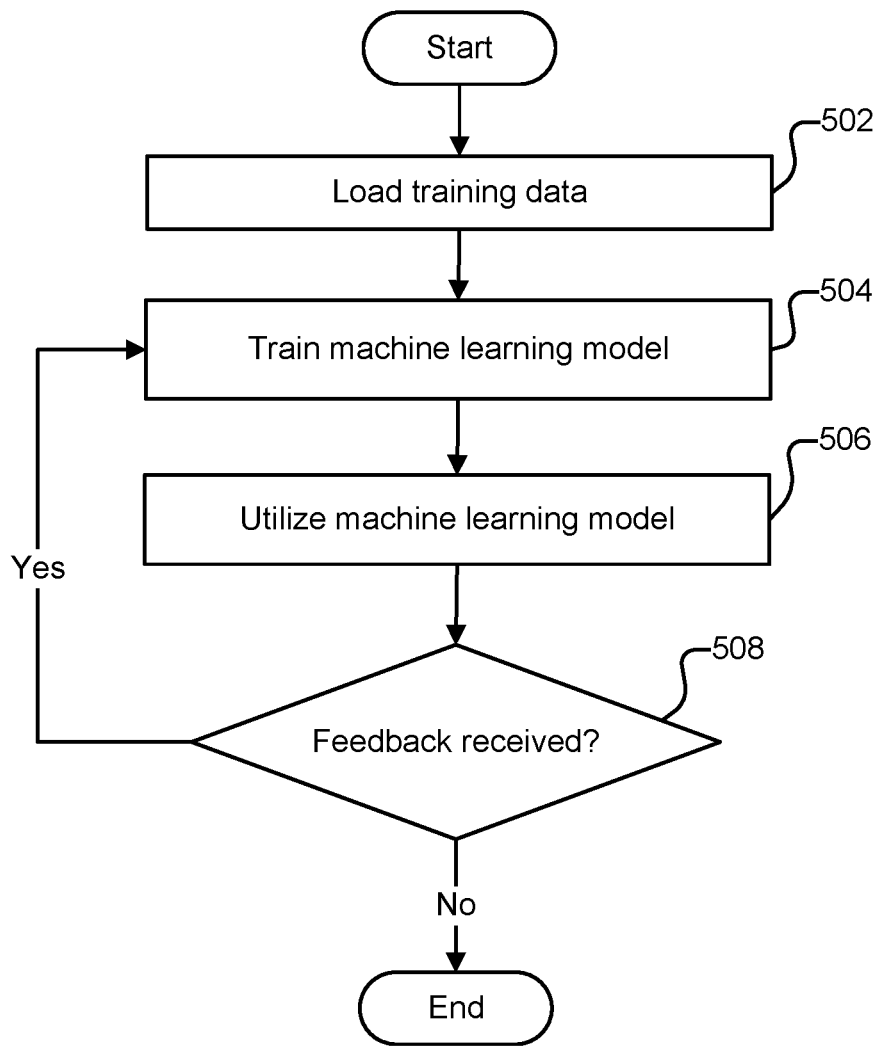
FIG. 5 is a flow diagram illustrating an embodiment of a process for incorporating feedback into machine learning model training.

FIG. 5 is a flow diagram illustrating an embodiment of a process for incorporating feedback into machine learning model training. In some embodiments, the process of FIG. 5 is performed by resource scheduling recommendation system 110 of FIG. 1 and/or resource scheduling recommendation system 200 of FIG. 2.

At 502, training data is loaded. In some embodiments, the training data is part of datasets 304 of framework 300 of FIG. 3A. In various embodiments, the training data includes labels indicating various properties of computing resource performance (e.g., CPU utilization, memory utilization, etc.). In various embodiments, the training data also includes predetermined groupings of computing resources that are manually determined (e.g., based on human review) to be similar based performance metrics. In various embodiments, the predetermined groupings are labeled with active versus inactive statuses corresponding to specified time periods (e.g., specified hours of the day or specified portions of hours of the day, such as half hours, quarter hours, and so forth).

At 504, the machine learning model is trained. In some embodiments, the machine learning model is a deep learning model that has a neural network architecture. In various embodiments, the machine learning model is trained by tuning neural network parameters to fit labeled training data. In various embodiments, the training data is labeled with predetermined groupings of computing resources and their times of activity and inactivity during a typical 24-hour period. In some embodiments, the machine learning model is trained for seven different 24-hour periods corresponding to different days of the week. In some embodiments, training occurs in training 306 of framework 300 of FIG. 3A and/or in model training 210 of FIG. 2.

At 506, the machine learning model is utilized. In various embodiments, the machine learning model is utilized to cluster computing resources according to received properties associated with the computing resources, such as CPU utilization, memory utilization, and other computing performance metrics. Furthermore, in various embodiments, the machine learning model outputs recommended times during the day for the computing resources to be started and stopped corresponding to their times of expected activity and inactivity, respectively, and/or their times of expected high demand and low demand, respectively. In some embodiments, the machine learning model is utilized according to framework 350 of FIG. 3B.

At 508, it is determined whether feedback is received. Examples of feedback include user feedback in response to recommendations made by the machine learning model. In some embodiments, the user feedback includes review of specific recommended start and stop times, corresponding to on and off times, for specific computing resources. For example, a user may manually override a recommended period of time when a computing resource is to be stopped/turned off and instead designate that period of time as turned on. Conversely, the user may also override an "on time" recommendation and convert it to an "off time" for another specific computing resource. The user may also rearrange recommended groupings by moving a specific computing resource from a first determined cluster of computing resources to a second determined cluster of computing resources. If it is determined at 508 that no feedback is received, no further action is taken. If it is determined at 508 that feedback is received, at 504, the feedback is utilized to modify training of the machine learning model. For example, the machine learning model may be retrained based on the feedback so that future performance of the machine learning model may be altered as a result of the feedback.

Figure 6:
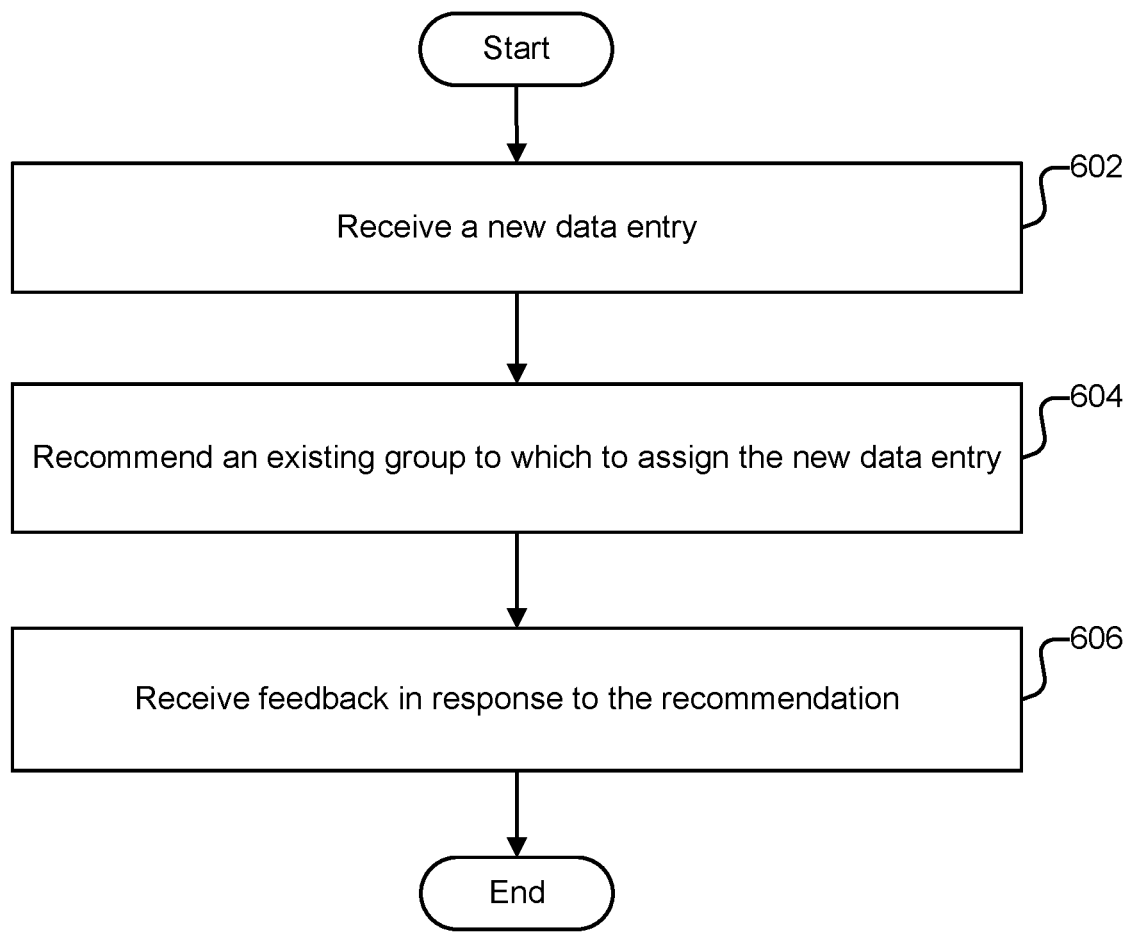
FIG. 6 is a flow diagram illustrating an embodiment of a process for recommending an existing group for a new data entry.

FIG. 6 is a flow diagram illustrating an embodiment of a process for recommending an existing group for a new data entry. In some embodiments, the process of FIG. 6 is performed by resource scheduling recommendation system 110 of FIG. 1 and/or resource scheduling recommendation system 200 of FIG. 2.

At 602, a new data entry is received. In some embodiments, the new data entry is a new computing resource for which a schedule is to be recommended. In some embodiments, the process of FIG. 6 is performed in order to avoid re-clustering previously clustered groups of computing resources. The advantage of avoiding re-clustering is saving computational resources (e.g., time and electrical energy). In many scenarios, it is inefficient to re-cluster when only one or a few new computing resources need to be added to an existing computing resources start and stop schedule.

At 604, an existing group to which to assign the new data entry is recommended. In various embodiments, the new data entry is a computing resource that has not been assigned to existing operating groups of computing resources. In various embodiments, properties of the new data entry are common to those used to cluster previous data entries. For example, if CPU utilization and memory utilization were utilized to create clusters of operating groups for computing resources, then CPU utilization and memory utilization can be used to compare the new data entry to existing clusters of operating groups. In some embodiments, a centroid approach is utilized to determine a most related/similar cluster to the new data entry. In some embodiments, properties (e.g., CPU utilization, memory utilization, etc.) associated with the new data entry are converted to a numerical representation (e.g., a vector corresponding to a location in a multi-dimensional vector space) and the numerical representation is subtracted from centroid locations of the existing clusters of operating groups to determine vector distances from the new data entry to centroids of the existing clusters of operating groups. The new data entry may be assigned to a neighboring (e.g., closest) centroid, corresponding to a most similar cluster.

At 606, feedback is received in response to the recommendation. For example, in response to recommending assignment of the new data entry to a specific existing cluster of computing resources, a user may review the recommendation and provide a specific feedback (e.g., approve the recommendation, reject the recommendation, or modify the recommendation). The user may alter the recommendation and assign the new data entry to a different cluster of computing resources. The feedback may be utilized for subsequent training of machine learning models associated with clustering computing resources into operating groups.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving properties associated with computing resources;
   using at least a portion of the received properties to cluster the computing resources into a plurality of operating groups, comprising at least a first operating group of already deployed computing resources that are active during a first time period and a second operating group of already deployed computing resources that are active during a second time period;
   using at least a portion of the received properties to determine a recommendation of an operation schedule for at least one of the operating groups in the plurality of operating groups;
   providing the recommendation;
   receiving a feedback in response to the recommendation;
   receiving an indication of a new computing resource to be assigned to at least one of the operating groups in the plurality of operating groups;
   comparing a set of computing properties of the new computing resource with corresponding sets of computing properties of the first operating group and the second operating group; and
   assigning the new computing resource to either the first operating group or the second operating group based at least in part on the comparisons of the set of computing properties of the new computing resource with the corresponding sets of computing properties of the first operating group and the second operating group.

2. The method of claim 1, wherein the received properties comprise central processing unit utilization metrics of the computing resources.

3. The method of claim 1, wherein the received properties comprise computer memory utilization metrics of the computing resources.

4. The method of claim 1, wherein the computing resources comprise a plurality of virtual machines.

5. The method of claim 1, wherein using the received properties to cluster the computing resources includes determining a numerical representation for each computing resource based on the received properties.

6. The method of claim 5, wherein the numerical representation is a vector comprising corresponding computing performance metric values associated with multiple time points in a twenty-four-hour period.

7. The method of claim 5, further comprising calculating distances, according to a distance metric, between numerical representations.

8. The method of claim 7, further comprising grouping the numerical representations such that numerical representations that are within a threshold range of one another according to the distance metric are assigned to distinct subgroups.

9. The method of claim 1, wherein using the received properties to cluster the computing resources includes utilizing a machine learning framework trained on datasets comprising a constrained set of computing resources associated with prescribed operating groups.

10. The method of claim 9, wherein the machine learning framework comprises one or more neural networks.

11. The method of claim 1, wherein using the received properties to determine the recommendation of the operation schedule includes utilizing a machine learning framework trained on datasets comprising a constrained set of computing resources associated with prescribed computing resource operating times.

12. The method of claim 11, wherein the machine learning framework comprises a long short-term memory neural network.

13. The method of claim 1, wherein the feedback in response to the recommendation includes an approval of the recommendation.

14. The method of claim 1, wherein the feedback in response to the recommendation includes a modification of a specific start or stop time for a specific computing resource.

15. The method of claim 1, wherein the feedback is utilized to update a machine learning model associated with clustering the computing resources into one or more operating groups.

16. The method of claim 1, wherein the feedback is utilized to update a machine learning model associated with recommending a start and stop schedule for at least one of the operating groups in the plurality of operating groups.

17. A system, comprising:
one or more processors configured to:
receive properties associated with computing resources;
use at least a portion of the received properties to cluster the computing resources into a plurality of operating groups, comprising at least a first operating group of already deployed computing resources that are active during a first time period and a second operating group of already deployed computing resources that are active during a second time period;
use at least a portion of the received properties to determine a recommendation of an operation schedule for at least one of the operating groups in the plurality of operating groups;
provide the recommendation;
receive a feedback in response to the recommendation;
receive an indication of a new computing resource to be assigned to at least one of the operating groups in the plurality of operating groups;
compare a set of computing properties of the new computing resource with corresponding sets of computing properties of the first operating group and the second operating group; and
assign the new computing resource to either the first operating group or the second operating group based at least in part on the comparisons of the set of computing properties of the new computing resource with the corresponding sets of computing properties of the first operating group and the second operating group; and
a memory coupled to at least one of the one or more processors and configured to provide at least one of the one or more processors with instructions.

18. A computer program product embodied in a non-transitory computer readable medium and comprising computer instructions for:
receiving properties associated with computing resources;
using at least a portion of the received properties to cluster the computing resources into a plurality of operating groups, comprising at least a first operating group of already deployed computing resources that are active during a first time period and a second operating group of already deployed computing resources that are active during a second time period;
using at least a portion of the received properties to determine a recommendation of an operation schedule for at least one of the operating groups in the plurality of operating groups;
providing the recommendation;
receiving a feedback in response to the recommendation;
receiving an indication of a new computing resource to be assigned to at least one of the operating groups in the plurality of operating groups;
comparing a set of computing properties of the new computing resource with corresponding sets of computing properties of the first operating group and the second operating group; and
assigning the new computing resource to either the first operating group or the second operating group based at least in part on the comparisons of the set of computing properties of the new computing resource with the corresponding sets of computing properties of the first operating group and the second operating group.

19. The computer program product of claim 18, wherein the received properties comprise central processing unit utilization metrics of the computing resources.

20. The computer program product of claim 18, wherein the received properties comprise computer memory utilization metrics of the computing resources.

* * * * *